(12) United States Patent
Ashourloo et al.

(10) Patent No.: US 10,958,151 B2
(45) Date of Patent: Mar. 23, 2021

(54) DISTRIBUTED CONTROL OF A MULTIPHASE POWER CONVERTER

(71) Applicant: NXP B.V., Eindhoven (NL)

(72) Inventors: Mojtaba Ashourloo, Toronto (CA); Venkata Raghuram Namburi, Brampton (CA); Gerard Villar Piqué, Eindhoven (NL); John Pigott, Phoenix (AZ); Olivier Trescases, Toronto (CA); Hendrik Bergveld, Eindhoven (NL); Alaa Eldin Y El Sherif, Plano, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/803,084

(22) Filed: Feb. 27, 2020

(65) Prior Publication Data

US 2020/0295649 A1 Sep. 17, 2020

(30) Foreign Application Priority Data

Mar. 14, 2019 (EP) ...................................... 19162898

(51) Int. Cl.
*H02M 1/00* (2006.01)
*H02M 3/00* (2006.01)
*H02M 1/32* (2007.01)

(52) U.S. Cl.
CPC ............... *H02M 1/00* (2013.01); *H02M 3/00* (2013.01); *H02M 2001/008* (2013.01); *H02M 2001/325* (2013.01)

(58) Field of Classification Search
CPC .... H02M 1/00; H02M 3/00; H02M 2001/008; H02M 2001/325; H02M 2003/1586; H02M 3/335; H02M 2001/0003; H02M 3/02
See application file for complete search history.

(56) References Cited

U.S. PATENT DOCUMENTS 7,373,527 B2 5/2008 Chapuis
7,479,772 B2 1/2009 Zane et al.
(Continued)

FOREIGN PATENT DOCUMENTS

DE 102016218498 A1 3/2018
WO 2017205098 A1 11/2017

OTHER PUBLICATIONS

Bento, Fernando Jose Figueiredo, "Fault Tolerant DC-DC Converters," Dissertation for obtaining the degree of Master of Science in Electrical and Computer Engineering, Universidade da Beira Interior, Jun. 2016, 62 pages.

(Continued)

*Primary Examiner* — Jung Kim

(57) ABSTRACT

Disclosed are switched-mode DC-DC power converter modules, SMPC controllers, and distributed-control multiphase SMPC systems. The controller comprises: a reference clock; a synchronisation input configured to receive a first synchronisation signal; a synchronisation output configured to transmit a second synchronisation signal; a control unit configured to control the operation of the SMPC module with a phase determined by the reference clock signal or the first synchronisation signal; a delay line configured to generate the second synchronisation signal by adding a delay to the selected one of the first synchronisation signal and the reference clock signal; a fault detection terminal; a memory configured to store a datum corresponding to a number N of SMPCs in the system; and a delay calculation module configured to calculate the delay in dependence on the datum and the signal at the fault-detection terminal. Associated methods are also disclosed.

13 Claims, 8 Drawing Sheets

(56) References Cited

U.S. PATENT DOCUMENTS

| | | |
|---|---|---|
| 7,667,625 B2 | 2/2010 | Prodic et al. |
| 10,734,914 B2 * | 8/2020 | Azidehak .............. H02M 7/483 |
| 2011/0133553 A1 | 6/2011 | Bui et al. |
| 2011/0199797 A1 | 8/2011 | Bridge et al. |
| 2013/0082669 A1 | 4/2013 | Xu |
| 2016/0315538 A1 | 10/2016 | Nguyen et al. |

OTHER PUBLICATIONS

Gleissner, et al., "Design and Control of Fault-Tolerant Nonisolated Multiphase Multilevel DC-DC Converters for Automotive Power Systems," IEEE Transactions on Industry Applications, vol. 52, No. 2, Mar./Apr. 2016, 11 pages.

\* cited by examiner

US 10,958,151 B2

DISTRIBUTED CONTROL OF A MULTIPHASE POWER CONVERTER

FIELD

The present disclosure relates to switched-mode DC-DC power converter modules and multiphase power converters and controllers therefor. It also relates to methods of operating modules in switched-mode power converters.

BACKGROUND

Switched-mode DC-DC power converters are required in many applications. Some applications, such as critical automotive applications, require a level of fault tolerance which may not be available with a single converter. For such applications, multiphase power converters can be useful solution. Multiphase power converters are typically implemented having a plurality of individual switched-mode DC-DC power converter modules or devices in parallel each operating in continuous conduction mode at the same frequency, with the devices being arranged such that the phases of their switching are interleaved. This typically requires a centralised controller which determines the relative phases of the devices to achieve optimum interleaving where input and output voltage ripple are minimized. A central controller may, however, present the possibility of a so-called "single-point failure". Distributed control may be desirable, but a problem remains as to how to control the phases of the modules in a simple way. This problem becomes particularly acute in the situation that one of the modules fails or becomes faulty.

SUMMARY

According to a first aspect of the present disclosure, there is provided a switched-mode DC-DC power converter, SMPC, controller for an SMPC module for use in a distributed-control multiphase power converter system, the SMPC controller comprising: a reference clock configured to generate a reference clock signal at a predetermined frequency; a synchronisation input ($SYNC_{IN,N}$) configured to receive a first synchronisation signal; a synchronisation output ($SYNC_{OUT,N}$) configured to transmit a second synchronisation signal; a control unit configured to control the operation of the SMPC module at the predetermined frequency and with a phase determined by the selected one of the clock signal and the first synchronisation signal; a delay line configured to generate the second synchronisation signal by adding a delay to the selected one of the first synchronisation signal and the reference clock signal; a fault detection terminal configured to receive a fault-detection signal; a memory configured to store a datum corresponding to a number N of SMPCs in the distributed-control multiphase power converter system; and a delay calculation module configured to calculate the delay in dependence on the datum and the fault-detection signal.

In one or more embodiments, the SMPC controller further comprises a fault-detection module, wherein the fault detection terminal is configured to transmit the fault-detection signal in response to the fault-detection module detecting a fault in the SMPC.

In one or more embodiments the fault-detection signal comprises binary signal indicative of the presence of absence of at least one fault. In other embodiments the fault-detection signal may comprise a signal indicative of a number, including zero, of faults: such embodiments may provide for fault tolerance against multiple failures of individual SMPCs in the system. The signal may be analogue or digital.

In one or more embodiments the delay calculation module is configured to determine the delay according to the inverse of the predetermined frequency, divided by a number of operational SMPC modules.

In one or more embodiments the number of operational SMPC modules is equal to the datum in the absence of at least one fault and is equal to the datum minus one in the presence of at least one fault; or, in the case of a power converter which is fault-tolerant against multiple module failures, the number of operational SMPC modules is equal to the datum minus the number of faults.

In one or more embodiments the controller is further configured to operate the SMPC module in continuous conduction mode, CCM. In other embodiments the SMPC module may be operable in boundary conduction mode, BCM.

According to another aspect of the present disclosure, there is provided an Integrated Circuit, IC, chip comprising an SMPC controller as described above.

According to a further aspect of the present disclosure, there is provided a switched-mode DC-DC power converter module, comprising: an SMPC controller as described above; a reactive element; a power output; and a switch operable by the controller and arranged in series with the inductor and configured to switchably supply current to the reactive element;

The switched-mode DC-DC power converter module may be configured as a buck converter or a half-bridge converter. Alternatively and without limitation it may be configured as one of a flyback converter and a multi-level hybrid converter.

According to yet further aspect of the present disclosure there is provided a distributed-control multiphase power converter system comprising at least two, or at least three, subsequent switched-mode DC-DC power converters each as described above and arranged in a linear chain, wherein the control unit of a first of the switched-mode DC-DC power converters is configured to control the operation of the first SMPC to have a phase determined by its clock signal, and wherein the control unit of each of the others of the switched-mode DC-DC power converters is configured to control the operation of the respective SMPC to have a phase determined by its respective first synchronisation signal, or its reference clock signal. As will become apparent hereinbelow, a system having only two SMPC modules is a specific case, wherein if a module fails, there would remain only one functioning module and there would be no requirement to re-align any phase. In case that a fault is detected in one of the power converters, that converter may be disabled, According to yet another aspect of the present disclosure, there is provided a method of controlling a switched-mode DC-DC power converter, SMPC, module for use in a distributed-control multiphase power converter system, the method comprising: receiving a first synchronisation signal; receiving a fault-detection signal; calculating the delay in dependence on the fault-detection signal and a datum, the datum corresponding to a number N of SMPCs in the distributed-control multiphase power converter system; generating the second synchronisation signal by adding a delay to a selected one of the first synchronisation signal and a reference clock signal; transmitting the second synchronisation signal; and controlling the operation of the SMPC module at the predetermined frequency, and with a phase determined by the selected one of a reference clock signal and the first synchronisation signal. The method may further comprise generating the reference clock signal at a predetermined frequency.

According to the yet further aspect of the present disclosure, there is provided a method of fault-tolerant distributed control of a multiphase power converter system comprising at least two, or at least three, SMPC modules, the method comprising controlling each of the SMPC modules connected in a linear chain, as described above, wherein the first SMPC module in the chain is controlled with its phase determined by the reference clock signal and each remaining module is controlled with its respective phase determined by the respective first synchronisation signal, such that the phases of the at least two SMPC modules are interleaved.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
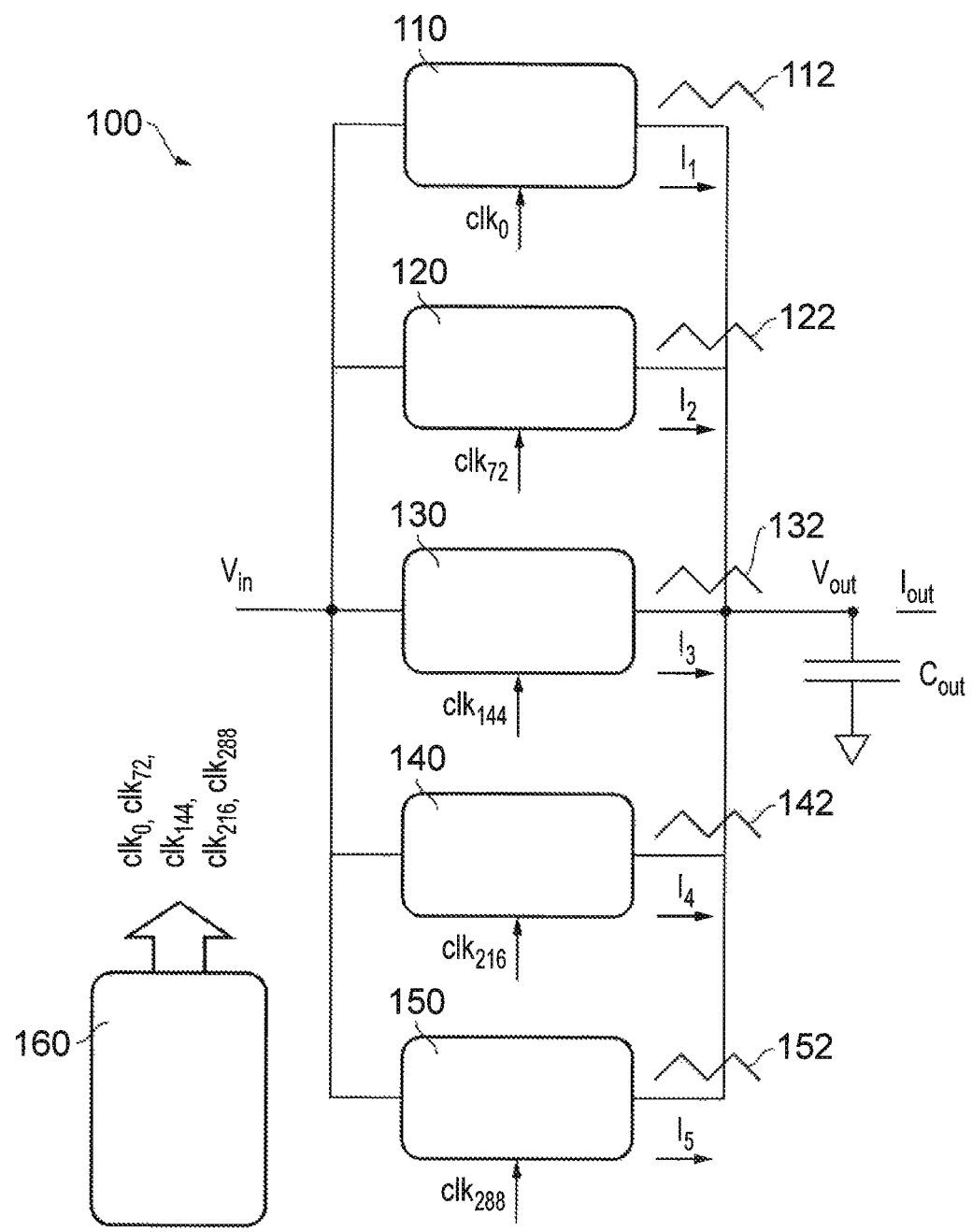
FIG. 1 illustrates a centrally controlled multiphase power converter.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates a typical configuration of a multiphase power converter 100, comprising a group, five in this case, of individual switched-mode DC-DC power converter (SMPC) modules, 110, 120, . . . 150. As will be familiar to the skilled person, each SMPC module includes an reactive element, to which current is switchably connected at a supply voltage. In general the reactive element is an inductive element. However, in one or more embodiments the reactive element may be a capacitive element. As will be appreciated, in the case of multiphase SMPCs having a capacitive element, proper phase interleaving to minimise current ripple is not in general such a concern as with multiphase SMPCs based on inductive elements; however, embodiments of the present disclosure as described below and having capacitive elements may allow reduced or minimised voltage ripple. Various topologies of SMPC are known, including but not limited to flyback, half bridge, buck, multilevel hybrid Dickson, etc., the operating characteristics of which vary. Further, SMPCs can be characterised by their output current, according to whether the current is continuously flowing (continuous conduction mode or CCM); continuous, but periodically falling to zero before immediately rising again (boundary conduction mode or BCM), or discontinuous, that is to say there are gaps between the current output (discontinuous conduction mode or DCM).

The present disclosure is primarily relevant to CCM, although embodiments may operate in BCM.

As shown in FIG. 1, the SMPCs are typically supplied by a common input voltage Vin.

In both CCM and BCM, the current output, I1, I2 . . . I5 from each SMPC module has a triangular waveform as shown at 112, 122, . . . 152. For buck, half-bridge and (hybrid) multi-level topologies and designs of the SMPC, the triangular waveform may be symmetrical as shown; depending on the effective input and output voltage values, the shapes may be asymmetric—typically with a steeper rise and a shallower fall.

The multiphase power converter 100 is supplied with a smoothing output capacitor C01, as shown. It should be mentioned that, in the case of identical SMPCs and perfect interleaving (which will be discussed in more detail below), the sum, Iout, of the output currents I1, I2, . . . I5, from each of the modules shows minimum current ripple. Due to the current-ripple cancellation effect caused by interleaving the operation of the SMPC modules the capacitance value of the smoothing capacitor is significantly smaller than would be required for an individual SMPC, in which the full triangular current variation of the single SMPC module should be compensated by the capacitor.

In order to ensure that the phases of the individual SMPCs are properly interleaved, a central multiphase controller 160 is typically provided, as shown. This provides switching control to each SMPC module. The timing of the switching of the modules is out-of-phase or interleaved. Thus, in the example shown of five modules, the relative phases of the module switching should be at 0°, 72°, 144°, 216°, and 288°. To achieve this, the multiphase controller 160 provides five separate clock signals, clk0, clk72, . . . clk288, one to each SMPC module.

Figure 2:
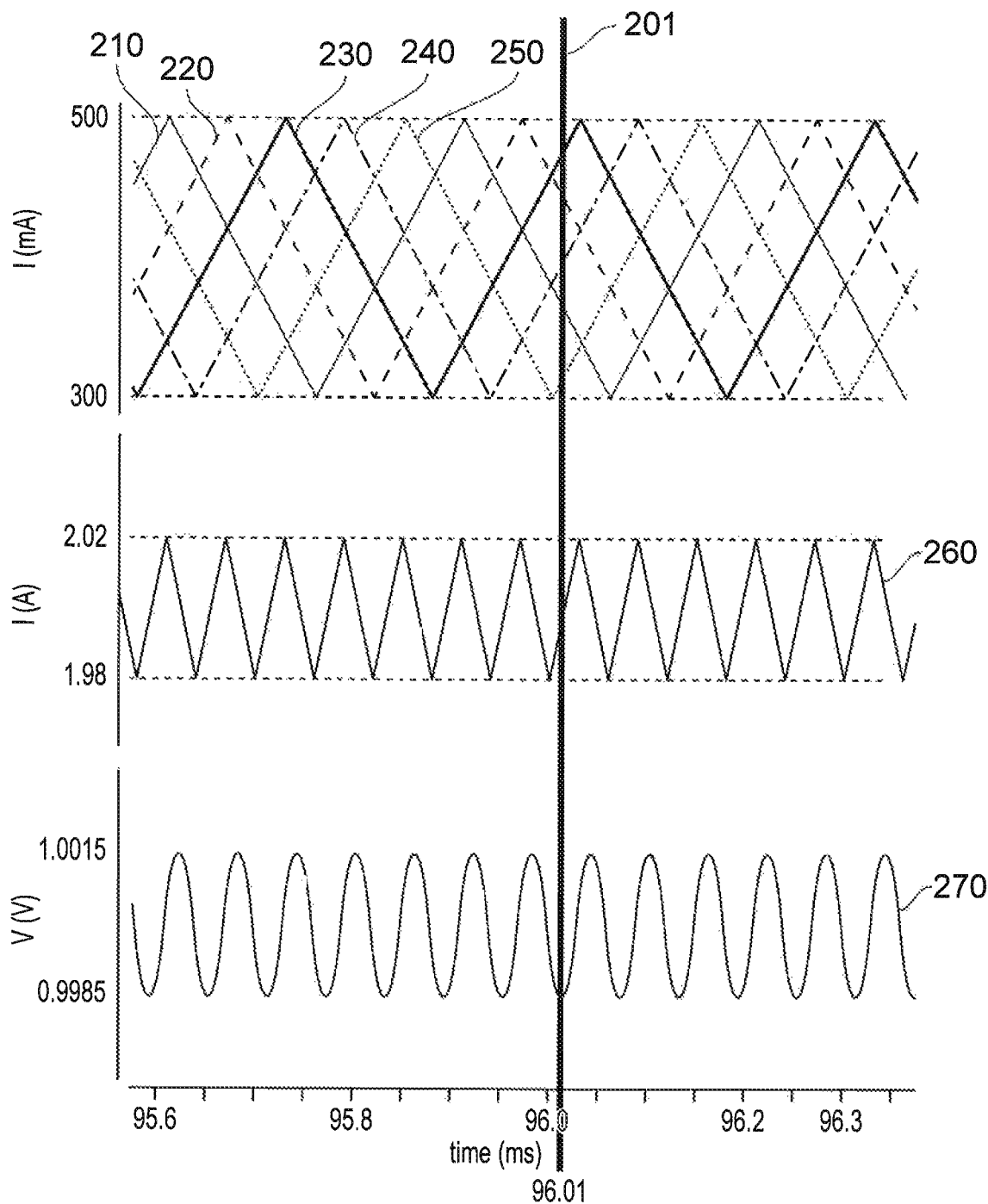
FIG. 2 shows output current and voltage for a power converter as shown in FIG. 1 in normal operation.

FIG. 2 shows the output current of each of the SMPC modules, at 210, 220, . . . 250, together with the sum of these currents, Iout, at 260, and the associated voltage ripple on the output voltage, at 270. At a moment in time of 96.01 ms, represented by the vertical line 201, it can be seen that the five modules each provide a current component, which differ significantly: approximately 320 mA, 360 mA, 400 mA, 440 mA, 480 mA; the sum of the currents adds up to 2 A. And whereas the individual currents vary over time between 300 mA and 500 mA, the output current is almost exactly constant, varying only between 1.98 and 2.02 A. This illustrates the minimization of the current ripple due to the interleaving action. As a result, the observed voltage ripple is only 3 mV for an output voltage of 1V.

Figure 3:
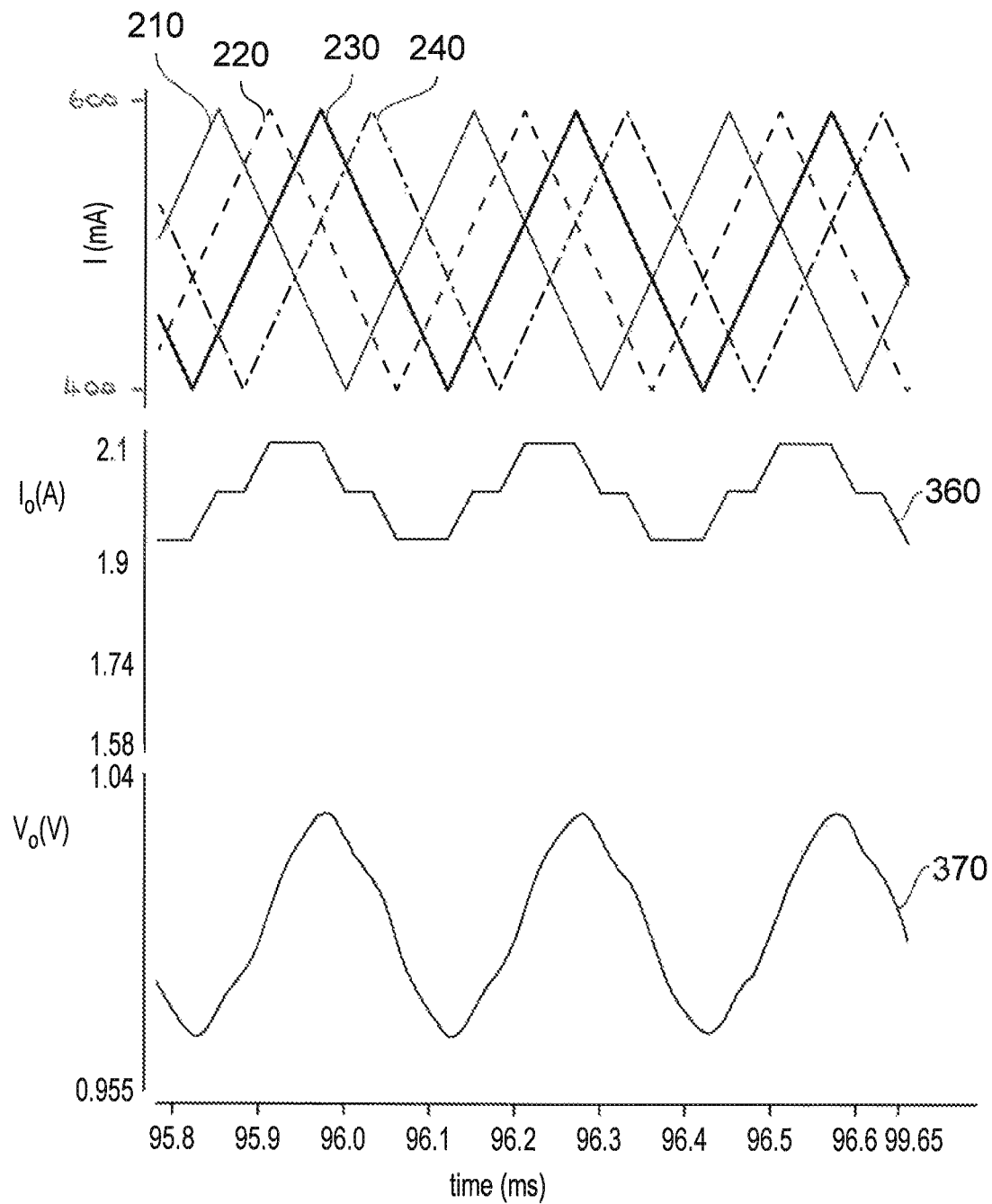
FIG. 3 shows output current and voltage for a power converter with one phase missing.

For a fault-tolerant system it is required that the interleaved operation is maintained even after one of the modules is disabled due to an internal fault. Otherwise, suboptimal performance would be obtained from the remaining system after the fault. FIG. 3 shows the different waveforms corresponding to the case of one module being disabled, without any realignment of the remaining phases, for a system such as that depicted in FIG. 2 in normal operation. In this case, there are only four operating modules, providing current outputs 210, 220, 230 and 240. The fifth module, which would have provided current output 250, is disabled. As shown in the figure, each module provides a current which varies, in this case, between 400 mA and 600 mA. The output current 360 now varies in a stepped fashion between 1.9 A and 2.1 A, illustrating that current ripple has increased. As a result of this increase in current ripple, using the same output smoothing capacitor the voltage ripple 370 has increased to approximately 60 mV.

Figure 4:
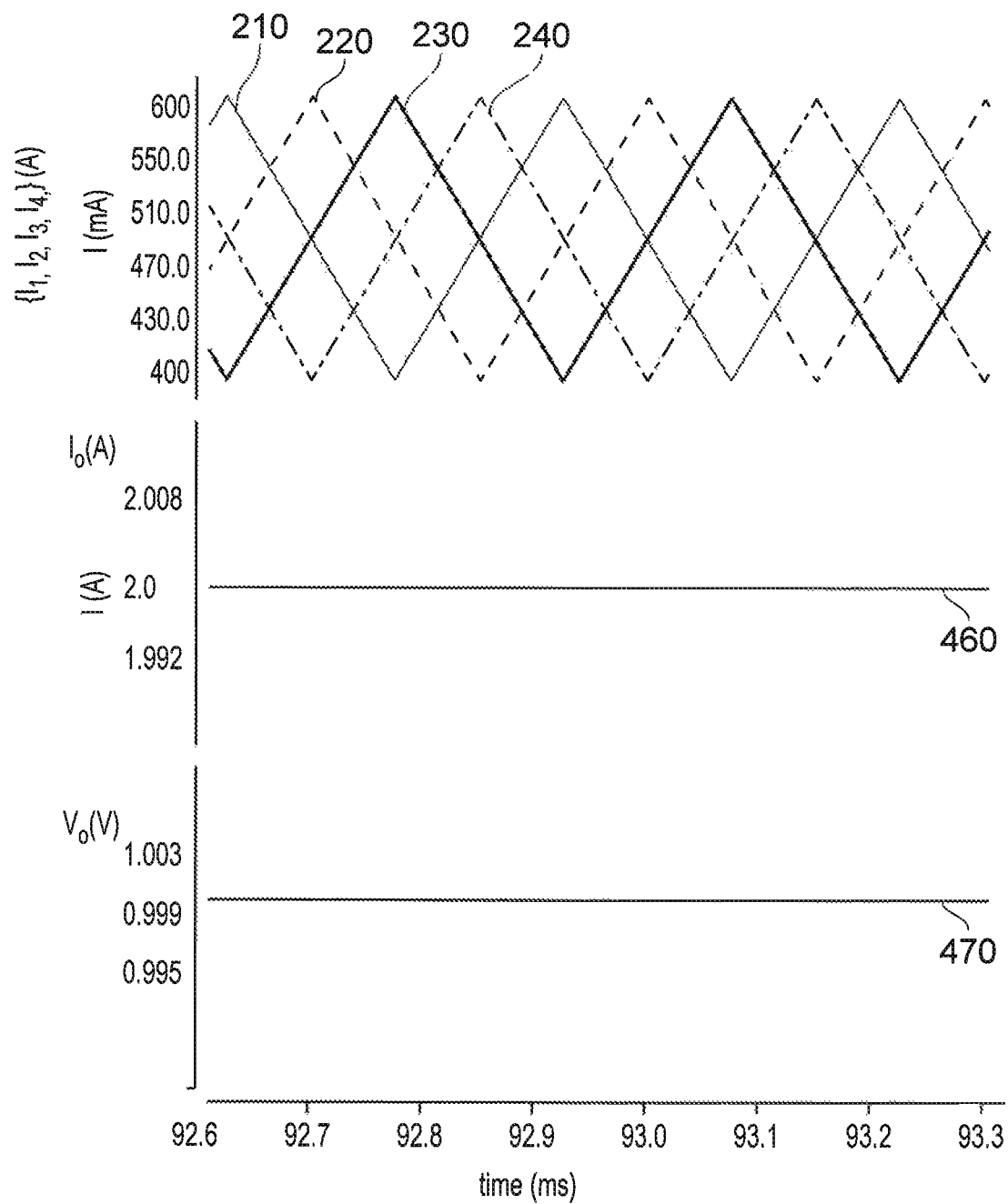
FIG. 4 shows output current and voltage for the power converter depicted in FIG. 3, with the remaining phases readjusted.

FIG. 4 shows the effect of readjusting the relative phases of the four remaining SMPC modules. Recalling that for 5 modules, the phase difference for perfect interleaving is 72° between the switching of each module, when one module is disabled such that only four operational modules remain, the ideal switching phase difference for perfect interleaving is then 90° such that the modules should be operating relative phases of 0°, 90°, 180°, and 270°. The figure shows the situation when the control of the four remaining modules has been readjusted so that the phase differences are 90°. It is apparent that the output current $I_O$, 460, is constant at 2 A, and there is negligible voltage ripple on the output voltage 470. Note that this case of exact ripple-current cancellation is specific for this case of having 4 active SMPC modules and 50% duty cycle of each module. In general, current ripple may reduced when the phase is readjusted to the ideal value after one of the modules has failed.

One of the problems of having a centralized control of the interleaving operation is that the number of signals generated by the controller needs to be adjusted to track the number of modules present in the system, for instance to reflect the change from five operational modules to four as shown in FIGS. 3 and 4. In case of requiring a different number of modules, a different controller might be required, or a substantially different controller configuration. Considering the advantages of modular designs, where systems can be easily expandable to address the needs of different products, it would be desirable to have a distributed system which easily allows a change in the number of modules without requiring a change in the controller.

Additionally, in case of centralized control of interleaving converters, if the central controller block would fail, the whole system would fail and stop its operation, which is a disadvantage for fault-tolerant systems.

This disclosure describes, inter alia, a method of controlling the interleaved operation of a decentralized multi-phase system independently of the number of modules that compose the system, without central control, and which is able to readjust the inter-module phase after one of the modules is disabled, e.g. due to a fault occurring in that particular module.

Figure 5:
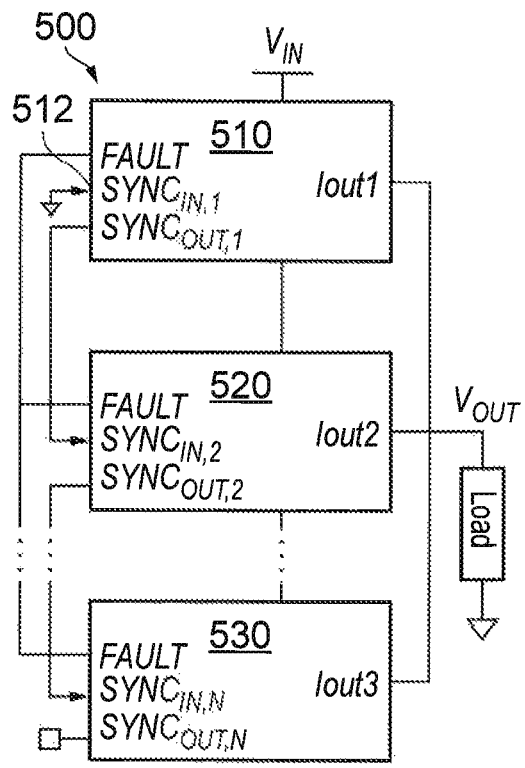
FIG. 5 shows a multiphase power converter according to one or more embodiments.

To that end there is provided a multiphase power converter as illustrated in FIG. 5. In this example, the multiphase converter 500 comprises three SMPC modules, 510, 520 and 530 (of course, there may be more modules, as indicated by the broken lines between 520 and 530). The modules are arranged as a linear chain. Each is supplied by a common voltage Vin. Interleaving is achieved by receiving a synchronisation signal (or generating the signal, in the case of the first module in the chain), and using that as the reference clock for each module, and adding a delay to the synchronization signal before passing it on to the next module. From the control perspective, the modules are connected in an open-loop chain architecture as shown. Each module receives a synchronization signal $SYNC_{IN}$ from its previous neighbouring module and passes on a modified synchronization signal $SYNC_{OUT}$ to its next neighbouring module, respectively.

In one or more embodiments, the synchronisation signal may simply be a clock signal operating at the switching frequency for each of the modelled modules. The phase of the clock signal varies along the open-loop chain, due to the addition of the delay at each module.

Figure 6:
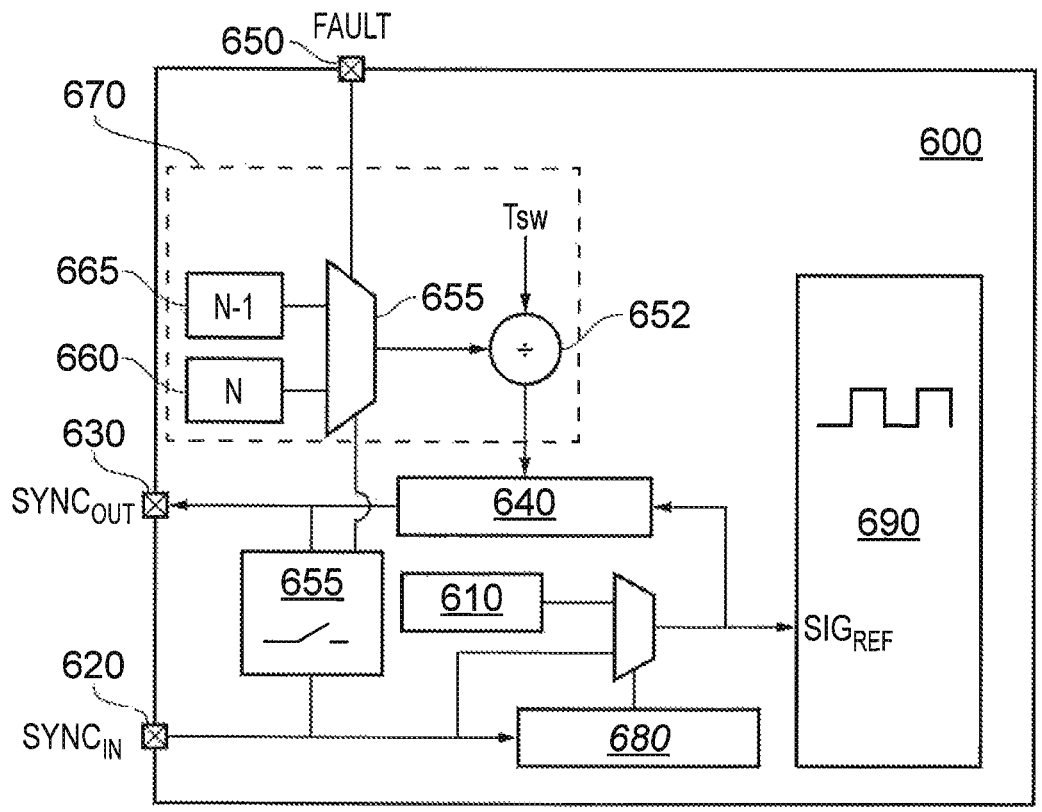
FIG. 6 illustrates an arrangement to adjust the synchronisation of a power converter module for a multiphase power converter.

FIG. 6 illustrates an arrangement to adjust the synchronisation of a power converter module for a multiphase power converter, according to one or more embodiments of the present disclosure. FIG. 6 shows relevant parts of a switched-mode DC-DC power converter controller 600 for an SMPC module for use in a distributed-control multiphase power converter system. Each power converter module includes one such controller. The SMPC controller comprises a reference clock 610 configured to generate a clock signal at a predetermined frequency. The controller includes a synchronisation input ($SYNC_{IN}$) configured to receive a first synchronisation signal, a synchronisation output ($SYNC_{OUT}$) configured to transmit a second synchronisation signal, and a delay line 640 configured to generate the second synchronisation signal by adding a delay to a selected one of the first synchronisation signal or the reference clock signal. The controller comprises a fault detection terminal 650 configured to receive a fault-detection signal, and a memory 660 configured to store a datum corresponding to a number N of SMPCs in the distributed-control multiphase power converter system. The controller includes a delay calculation circuit 670 configured to calculate the delay in dependence on the datum and the fault-detection signal. The controller includes a control unit 690, which controls the operation of the SMPC module at the predetermined frequency, and with a phase determined by one of the reference clock signal and the first synchronisation signal. The controller selects the reference clock signal or the first synchronisation signal according to whether the SMPC module is the first in the linear chain—and adds the delay to the corresponding signal. The skilled person will be familiar that the design of the control unit will vary, depending on the topology of the SMPC module, in particular it may include a variety of outputs, in dependence on the topology. As nonlimiting examples: in the case of a half bridge power converter, the control unit provides a control output for each of the low and high switches in the half bridge; in the case of a multi-level PC, the number of outputs equals the number of used switches in the particular topology. For example, a hybrid 4:1 Dickson power converter requires 8 control outputs to drive 8 switches.

The controller thus implements a method of controlling a switched-mode power converter, SMPC, module for use in a distributed-control multiphase power converter system according to one or more embodiments of the present disclosure. The method comprises receiving a first synchronisation signal and receiving a fault-detection signal. From a datum corresponding to a number N of SMPCs in the distributed-control multiphase power converter system, and the fault-detection signal the length, in time, of the delay is calculated.

This delay is then added to the first synchronisation signal, or the reference clock signal in the case of the "first" module in the linear chain, in order to generate the second synchronisation signal. Thus in an example case of a multiphase power converter having five modules, if the fault-detection signal indicates that there is no faulty module, the delay will correspond to a phase shift of 72° (that is to say 360° divided by 5). Conversely, if the fault-detection signal indicates that there is a faulty module, then the delay corresponds to a phase shift of 90° (that is to say 360° divided by 4). This phase shift is added to the incoming or first synchronisation signal $SYNC_{IN}$, or to the reference clock signal depending on the presence of the first synchronisation signal, to result in the outgoing or second synchronisation signal $SYNC_{OUT}$. If the controller is the (n)th controller in the open-loop chain, the second synchronisation signal $SYNC_{OUT,N}$ is transmitted or passed to the next—(n+1)th controller in the open-loop chain, as that controller's first synchronisation signal. $SYNC_{IN, N+1}$.

Viewed from the perspective of time, the delay calculation module is configured to determine the delay according to the inverse of the predetermined frequency, divided, at 652, by a number of operational SMPC modules. The number of operational SMPC modules is determined, at 665 to be either N, according to datum stored in memory 660, or N−1, as shown at 65, in case a fault is detected. Thus considering the same example above with five modules, and assuming they are operating at 250 kHz the delay corresponds to the period corresponding to 250 kHz—that is to say 4 µs—divided by 5, i.e. 0.8 µs in the case of no faulty modules, and 4 µs divided by 4, i.e. 1 µs in the case of a faulty module. (The faulty module is disabled, with a "pass-through" of the synchronisation signal, such that it's second, outgoing, synchronisation signal $SYNC_{OUT}$ is set to match its first, incoming, synchronisation signal $SYNC_{IN}$.

As mentioned above, the controller controls the operation of the SMPC module at the predetermined frequency, and with a phase determined by a one of the reference clock signal and the first synchronisation signal. Turning back to FIG. 6, control of the operation of the SMPC module, by the control unit 690, is by means of the signal $SIG_{REF}$, which is thus either $SYNC_{IN}$, or the signal produced by the controller's internal reference clock 610. The choice of whether to use $SYNC_{IN}$ or the internal reference clock 610 is made by reference selector block 680. The $SYNC_{IN}$ signal is grounded for the first module of the chain, as shown at 512 in FIG. 5. In this case, the reference selector block 680 detects the absence of a $SYNC_{IN}$ signal at the first synchronisation input terminal 620 and uses the clock signal coming from the internal reference clock 610. This sets the operating frequency for all the SMPC modules in the multiphase power converter and ensures that they all operate at the same switching frequency.

The SMPC module is thus controlled to operate at the predetermined frequency, and with a phase determined by a one of a reference clock signal and the first synchronisation signal.

In one or more embodiments, the value of N may be programmed into the individual modules after the system design has determined the desired number of interleaved modules N in the system. This allows flexibility of using the modules in multi-phase power converters with any desired number of modules N.

The skilled person will appreciate that, as described above, the internal reference clock 610 is used in only one SMPC module in the multiphase power converter. Thus, in one or more embodiments it would be possible to entirely omit the internal reference clock from each of the remaining modules, and omit the reference selector block from all of the modules, and thus provide a different SMPC module controller for the first module compared with that provided for the other modules. However, such a situation would not allow for identical controllers, and thus reduce the flexibility and full tolerance of the system overall, in particular were the first module to fail.

As mentioned above, each controller comprises a fault detection terminal 650 configured to receive a fault-detection signal. Each fault detection terminal 650 is connected to a common bus, denoted as FAULT. To manage the failure of a module, the common bus, shared among all modules, is asserted high upon failure of any of the modules. Typically, the assertion will be made by the module which experience the fault or failure, although in one or more embodiments an external fault detection and notification system may be provided and may make the assertion. The common bus indicates to the remaining healthy system modules of the absence of one of the modules in the system. Subsequently, the desired interleaving phase-shift applied to the distributed $SYNC_{OUT}$ signal is modified in all remaining modules of the system to 360°/(N−1), as described above. Inside the faulty module, the $SYNC_{IN}$ input is directly passed on as $SYNC_{OUT}$ output without any phase shift, as shown schematically by the fault-triggered bypass circuit 655. As such, the remaining modules restore ideal phase alignment.

In the embodiment in FIG. 5, all the module controllers may be identical in construction and configuration. As explained above, by grounding the $SYNC_{IN}$ input of the first module, this module will use its internal reference clock to which all remaining modules are synchronized. When the first module fails, it will pass on its grounded $SYNC_{IN}$ input to its $SYNC_{OUT}$ output. Therefore, the second module in the chain will see its $SYNC_{IN}$ input grounded. As a result, this second module will now use its internal clock reference 610, and all remaining modules will be synchronized to this clock signal. As before, all modules will therefore operate at the same clock frequency, which changes from the internal clock frequency of the first module to that of the second module in case of failure of the first module. This illustrates the advantage of using the same design for all modules, since it leads to maximum flexibility and fault tolerance of the system.

Figure 7:
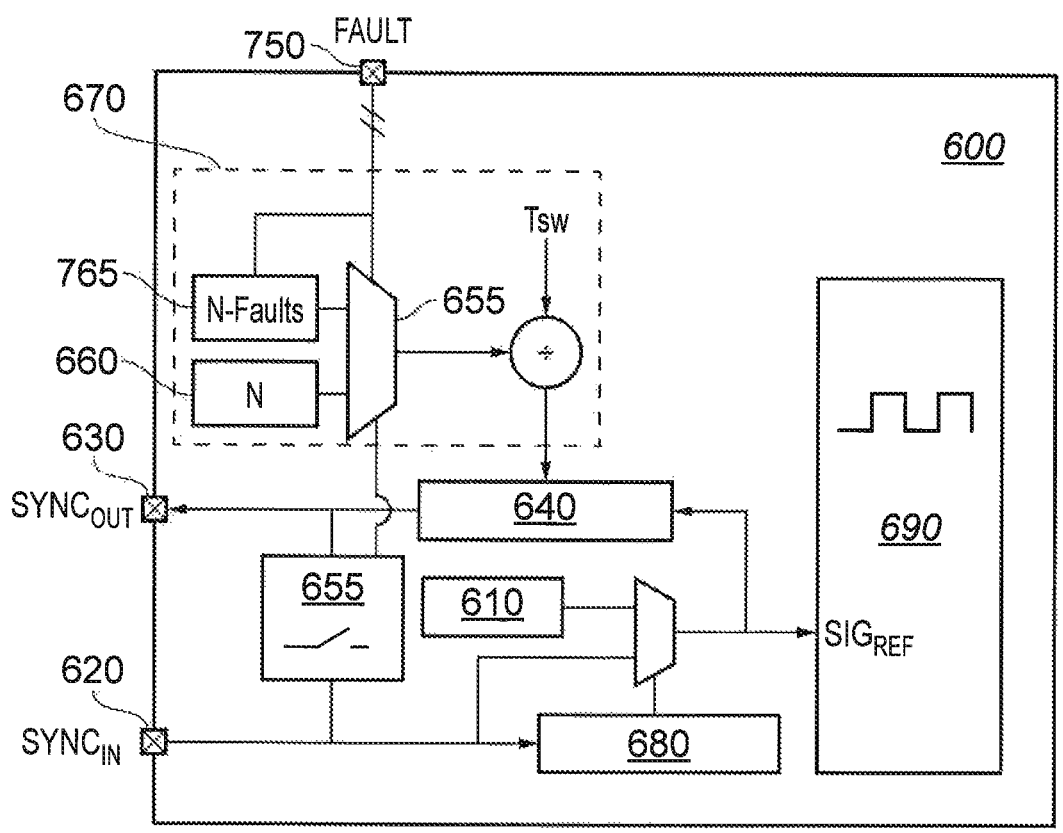
FIG. 7 illustrates an arrangement to adjust the synchronisation of the power converter module for a multiphase power converter which can compensate more than one disabled modules.

The embodiments described above, having a common bus FAULT which may be asserted high in the case that a fault is detected in any one of the SMPC modules, provide fault tolerance against a fault or failure in a single SMPC module. Other embodiments can provide fault tolerance against faults or failures in more than one SMPC module: a controller according to one or more such embodiments is shown in FIG. 7. The controller shown in FIG. 7 is generally similar to FIG. 6, except that instead of the fault-detection signal comprising a binary signal indicative of the absence of any, or the presence of at least one, fault, the fault detection-signal comprises a signal indicative of a number, including zero, of faults. Typically, this corresponds to a value on the common bus which is thus available at the fault detection terminal, either as a digital signal or the level of an analogue signal. In such embodiments, the delay calculation circuit determines how many operational SMPC modules there are in the multiphase power converter. The number of operational SMPC modules is equal to the datum minus the number of faults. This enables the determination of the appropriate value of the phase shift, and thus the appropriates length of the delay $T_{SW}/(N-n)$, where n is the number of faults detected.

Figure 8:
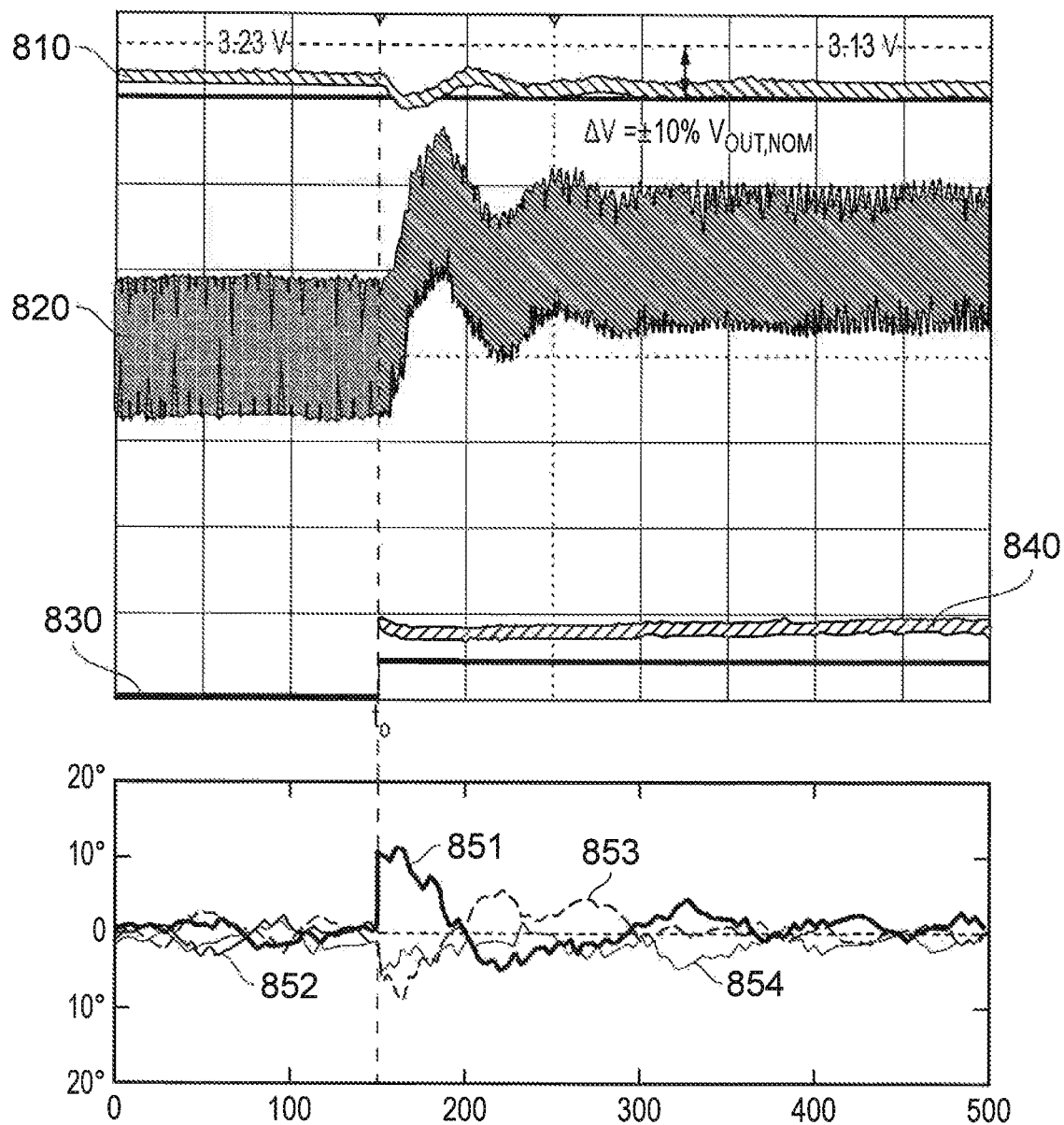
FIG. 8 illustrates operation of a multiphase power converter in the event that the second or a subsequent module in the chain becomes disabled.

Turning now to FIG. 8, this illustrates operation of a multiphase power converter, measured in a prototype multiphase system, in response to the event that the second or a subsequent module in the chain becomes disabled. In this case, the multiphase power converter initially has four operational SMPCs, and after a disablement event, has three operational SMPCs. The top half of the figure shows output voltage 810, an overlay of the output currents from four (and three after moment $t_0$) operational SMPCs 820, a signal 830 which is asserted high at a moment in time, to, at which one of the modules is disabled as the result of a detected fault, and the output current of the disabled SMPC module 840, which becomes zero after moment $t_0$. The bottom half of the plot shows the relative phase shift errors, 851, 852, 853 and 854, initially, that is to say towards the left of the figure, relative to the ideal 90° phase shift for a 4-operational-SMPC power converter, and then after the disablement event occurs, shown at 150 μs on the time axis ($t_0$), from the ideal 120° for a 3-phase-operational-SMPC power converter, towards the right of the plot. In the specific example shown, the second module is disabled such as that the phase difference 852 between the second and third module becomes zero. As can be seen from the figure, the currents of all the three remaining phases settles within approximately 150 μs of the disablement event. As can be seen, the output currents of the remaining phases settle to a higher DC value since the load current has remained the same and current is now distributed over 3 instead of 4 modules. Due to the applied voltage droop control in each module, applied to achieve equal current sharing between modules by lowering the internal voltage reference in each module for higher average current, the resulting DC output voltage is 100 mV lower than before disabling module number 2. And, from observing the phase difference plots towards the bottom of the diagram, it is apparent that the phase errors quickly fall, such that the phase difference settles to be within the range of 118°-122°, within the 200 μs of the disablement event.

Figure 9:
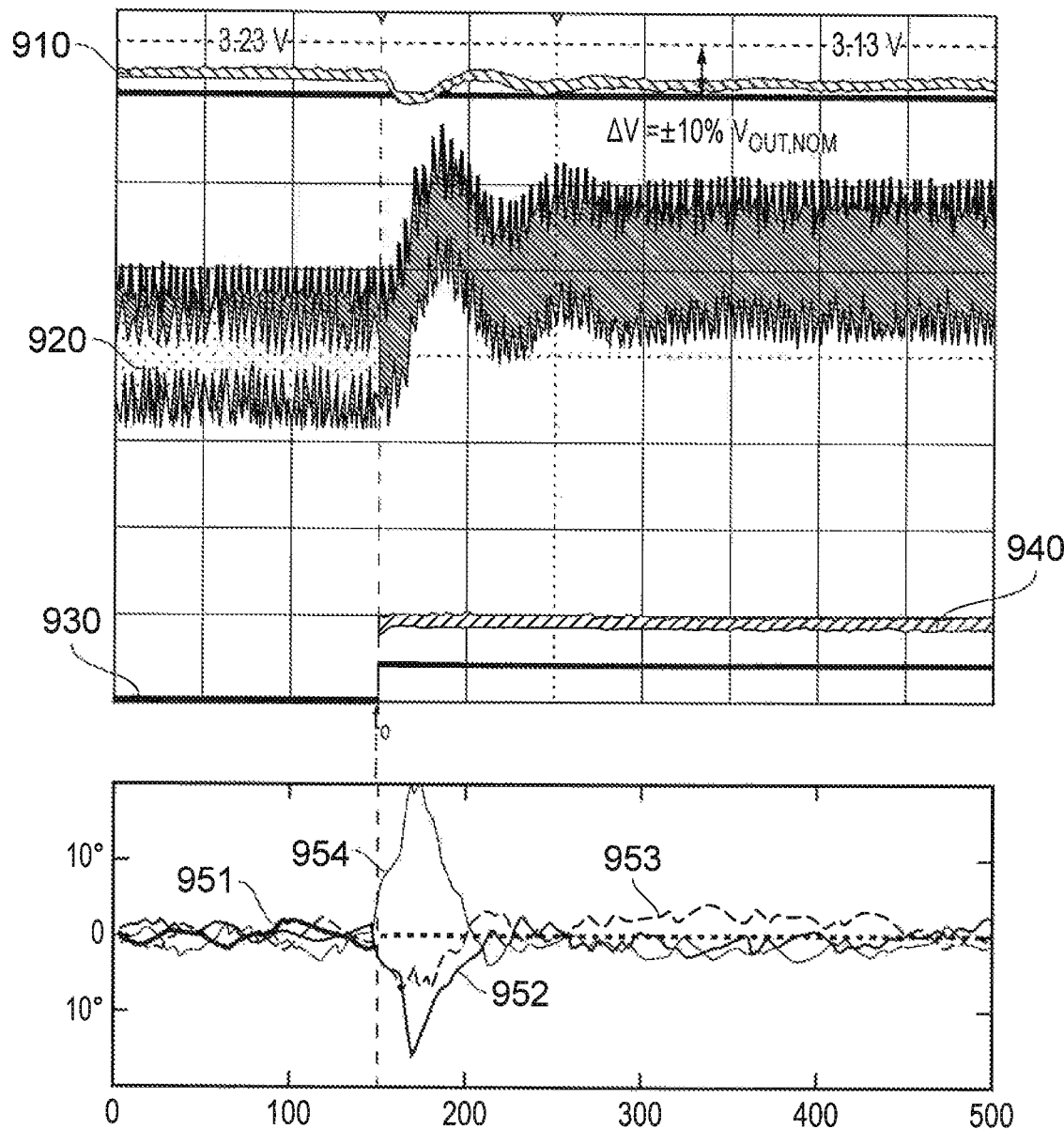
FIG. 9 illustrates operation of a multiphase power converter in the event that the first module in the chain becomes disabled.

FIG. 9 shows operation of a multiphase power converter in the event that the first module in the chain becomes disabled. This figure is very similar to FIG. 8, with corresponding plots for output voltage 910, overlay of the output currents from four (and three after moment to) operational SMPCs 920, a signal 930 which is asserted high at a moment in time, $t_0$, at which time one of the modules is disabled as the result of a detected fault, and the output current of the disabled SMPC module 940, which becomes zero after moment t0. The bottom half of the plot shows the corresponding relative phase shift errors, 951, 952, 953 and 954. It is apparent that again the output currents settle to a constant higher value within 150 μs of the disablement events; the relative phase errors are initially larger than is the case with the second or subsequent module becoming disabled; however it is also apparent that the phase errors quickly fall to a negligible level. This illustrates the proper transfer from the internal reference clock of the first, disabled, module and that of the second module, as described above.

The skilled person will appreciate that the nominal value of the operating switching frequency (or switching period $T_{SW}$) needs to be known by all controllers in the system to be able to properly define the delay added to $SYNC_{IN}$. Typically, this may be provided when setting up the entire system, as in the embodiment shown in FIG. 6, alternatively the controller may be configured such that the information could be extracted from the control $SIG_{REF}$, since the period time of which divided by N or N−1 (or N−n in the case of n faults) determines the required delay of the delay line.

It will also be appreciated that according to embodiments of the present disclosure, only 3 signals need be required to operate any number of modules in interleaving. These are all digital signals, 2 of them operating at the rather low operating frequency of the power converters ($SYNC_{IN}$ and $SYNC_{OUT}$, running at switching frequency of one module, in range of few 100 kHz), while the FAULT signal is quasi-static being used only to report a fault.

Furthermore, beneficially, the aforementioned communication links are only required for the proper interleaving of the multi-phase system, and the loss of any of them may not necessarily halt the operation of the system as a result of each module being able to run on its own internal reference clock in absence of its synchronisation signal input. Although it will be appreciated that under such an operating case optimum interleaved operation would not be guaranteed anymore. Nonetheless, the fault-tolerance of the system overall may be thereby enhanced.

From reading the present disclosure, other variations and modifications will be apparent to the skilled person. Such variations and modifications may involve equivalent and other features which are already known in the art of multi-phase switched-mode DC-DC power converters, and which may be used instead of, or in addition to, features already described herein.

Viewed from another perspective disclosed herein is an SMPC controller for controlling a one of a plurality of switched-mode DC-DC power converter modules for use in a distributed-control multiphase power converter system, the SMPC controller comprising: a reference clock generator configured to generate a reference clock signal at a predetermined frequency; a selection circuit configured to select a one of the reference clock signal and a first synchronisation signal received at an input; a control unit configured control the operation of the SMPC module at the predetermined frequency, and with a phase determined by a selected one of the reference clock signal and the first synchronisation signal; a delay line configured to add a delay to the selected one of the reference clock signal and the first synchronisation signal and to provide the delayed signal at an output; the controller being further configured to receive fault information from a fault-detection input, and to calculate the delay in dependence on the fault information and the number of switched-mode DC-DC power converter modules in the distributed-control multiphase power converter system.

The SMPC controller may further comprise a memory configured to store a datum corresponding to a number N of SMPCs in the distributed-control multiphase power converter system. It may further comprise a circuit to determine the fault information from a fault-detection signal received at the fault-detection input. Moreover, it may further comprise a delay calculation circuit configured to calculate the delay in dependence on the datum and the fault-detection signal.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A switched-mode DC-DC power converter (SMPC) controller for an SMPC module for use in a distributed-control multiphase power converter system, the SMPC controller comprising:
    a reference clock configured to generate a reference clock signal at a predetermined frequency;
    a synchronisation input ($SYNC_{IN,N}$) configured to receive a first synchronisation signal;
    a synchronisation output ($SYNC_{OUT,N}$) configured to transmit a second synchronisation signal;
    a control unit configured to control the operation of the SMPC module at the predetermined frequency, and with a phase determined by a selected one of the reference clock signal and the first synchronisation signal;
    a delay line configured to generate the second synchronisation signal by adding a delay to the selected one of the first synchronisation signal and the reference clock signal;
    a fault detection terminal configured to receive a fault-detection signal;
    a memory configured to store a datum corresponding to a number N of SMPCs in the distributed-control multiphase power converter system; and
    a delay calculation module configured to calculate the delay in dependence on the datum and the fault-detection signal.

2. An SMPC controller as claimed in claim 1, further comprising a fault-detection module, wherein the fault detection terminal is configured to transmit the fault-detection signal in response to the fault-detection module detecting a fault in the SMPC.

3. An SMPC controller as claimed in claim 1, wherein the fault-detection signal comprises a binary signal indicative of the presence of absence of at least one fault.

4. An SMPC controller as claimed in claim 1, wherein the fault-detection signal comprises a signal indicative of a number, including zero, of faults.

5. An SMPC controller as claimed in claim 1, wherein the delay calculation module is configured to determine the delay according to the inverse of the predetermined frequency, divided by a number of operational SMPC modules.

6. An SMPC controller as claimed in claim 3, wherein the number of operational SMPC modules is equal to the datum in the absence of at least one fault and is equal to the datum minus one in the presence of at least one fault.

7. An SMPC controller as claimed in claim 1, wherein the controller is further configured to operate the SMPC module in continuous conduction mode (CCM).

8. An Integrated Circuit, IC, chip comprising an SMPC controller as claimed in claim 1.

9. A switched-mode DC-DC power converter module, comprising:
    a SMPC controller as claimed in claim 1;
    a reactive element;
    a power output;
    a switch operable by the controller and arranged to control the reactive element and configured to switchably supply current to the reactive element.

10. A switched-mode DC-DC power converter module according to claim 9, wherein the reactive element comprises an inductive element.

11. A switched-mode DC-DC power converter module according to claim 9, configured as a buck or half-bridge converter.

12. A switched-mode power converter module according to claim 9, configured as one of a flyback converter and a multi-level hybrid converter.

13. A distributed-control multiphase power converter system comprising at least three switched-mode DC-DC power converter modules each as claimed in claim 9 and having their respective SMPC controllers arranged in a linear chain,
    wherein the control unit of a first of the switched-mode DC-DC power converters is configured to control the operation of the first SMPC to have a phase determined by its reference clock signal,
    and wherein the control unit of each of the others of the switched-mode power DC-DC converters is configured to control the operation of the respective SMPC to have a phase determined by its respective first synchronisation signal.

* * * * *